(12) United States Patent
Li et al.

(10) Patent No.: US 8,540,905 B2
(45) Date of Patent: Sep. 24, 2013

(54) CHEMILUMINESCENT COMPOSITIONS AND METHODS OF MAKING AND USING THEREOF

(76) Inventors: Weiwei Li, Hubei District (CN); Hong Du, Hungqiao District (CN); Yi Chen, Hongqiao District (CN); Ning On, South Horizons (HK)

( * ) Notice: Subject to any disclaimer, the term of this patent is extended or adjusted under 35 U.S.C. 154(b) by 62 days.

(21) Appl. No.: 13/170,376

(22) Filed: Jun. 28, 2011

(65) Prior Publication Data

US 2013/0001485 A1    Jan. 3, 2013

(51) Int. Cl.
*C09K 3/00* (2006.01)

(52) U.S. Cl.
USPC .......................................................... 252/700

(58) Field of Classification Search
USPC .......................................................... 252/700
See application file for complete search history.

(56) References Cited

U.S. PATENT DOCUMENTS

| 5,043,851 | A  | * | 8/1991 | Kaplan ........................... 362/34 |
| 5,188,395 | A  | * | 2/1993 | Kawahara et al. ............. 283/113 |
| 6,348,432 | B1 | * | 2/2002 | Elmasry ........................ 503/201 |
| 7,234,827 | B2 | * | 6/2007 | Fujita ............................. 362/34 |

OTHER PUBLICATIONS

English abstract of CN-101205462 (Jun. 25, 2008).*
Machine translation of CN-101205462 (Jun. 25, 2008).*

* cited by examiner

*Primary Examiner* — Vu A Nguyen
(74) *Attorney, Agent, or Firm* — Gerald F. Dunne

(57) ABSTRACT

A chemiluminescent composition comprising an oxalate and an activator component wherein at least one of said oxalate or activator components contains a fluorescer and at least one of said oxalate or activator components contains an organic polymer. The combined concentration of said organic polymer contained in both components is above 50% by weight of the total composition, and said organic polymer is an insoluble solid. Further, The activator component contains a peroxide at a concentration below 2% by weight of the total composition.

2 Claims, No Drawings

CHEMILUMINESCENT COMPOSITIONS AND METHODS OF MAKING AND USING THEREOF

FIELD OF THE INVENTION

The present invention relates to chemiluminescent compositions and a production process for creating self-illuminating compositions, including solid-state compositions, which have a high level of stability and can be applied to a variety of substrates that are generally sensitive to existing chemiluminescent compositions.

BACKGROUND

Chemiluminescent compositions, such as used in a basic "Glow-Stick" product, utilize a two-component system to chemically generate light. As with any contained chemical reaction, the reaction is limited in time, and once the components are mixed, the reaction will begin using up the reactive components. In chemiluminescent applications, the "glow" will begin bright, but will slowly fade as the reaction proceeds. In a typical two-component chemiluminescence system, the components are kept separate, where one is stored or sealed-off in a breakable container. When the user wishes to initiate the reaction (and create the "glow" effect), the user breaks the breakable container allowing mixing of the two components and thereby initiating the reaction.

In typical chemiluminescent applications the two components usually include (1) the "oxalate" component, and (2) the "activator" component, containing an oxidant, along with a fluorescer. When mixed the oxidant of the activator reacts with the oxalate to create highly reactive peroxy components that in turn act to excite the fluorescer, causing the glow effect. This two-component system is described in detail in U.S. Pat. Nos. 3,816,326, 4,313,843, 5,122,306, 7,674,406; and the United States patent application, Pub. No. 2010/0288984.

Traditional chemiluminescent oxidation compositions are in liquid form with very low viscosity (lower than 50 mPa·s); however, such low viscosity requires physical devices to store the components of the composition, even after the mixing, limiting the uses of such applications to contained applications, such as "glow sticks." Further, the chemiluminescent effect and usage can be limited by the characteristics of containers.

Additionally, traditional chemiluminescent compounds require an oxidant, such as hydrogen peroxide, in relatively large concentrations. An oxidant is required as part of the activator component, and serves to react/activate the oxalate, creating the glow effect. However, use of such high concentrations of peroxide (which can have adverse affects such as bleaching of hair, skin and clothes) also necessitated that the compound be contained in a sealed container. Such a compound is fine for early popular uses, such as "glow sticks," but was not suitable for a loose compound, such as a viscous gel or solid-state composition that could be used freely, and applied to the body or hair for example. U.S. Pat. No. 7,674,406 and United States patent application, Pub. No. 2010/0288984 overcome this problem by creating a viscous gel using lower oxidant concentrations, wherein the oxidant concentration is between 2% and 20%.

Chinese patent application 200610130440.4 and United States patent application, Pub. No. 2010/0288984 solve the problem by creating a solid-state chemiluminescent composition, in which the use of a container is optional after activation. It can be easily spread to a desired area for illumination or marking purpose. It is easy to remove, and will cause very little to no contamination. However, the product as disclosed by these applications exhibits particular shortcoming regarding stability that the present inventions seeks to address.

The solid-state compounds disclosed in the above prior art, and any known solid-state chemiluminescent compositions, are not only affected by the peroxide levels, but are also affected by the choice of solid filler used. The solid filler should have the following characteristics: (1) the solid should not affect the chemiluminescence reaction (i.e. the solid should not react with the other compounds); (2) the solid, within limit, must have a large enough surface area to weight ratio (low density); and (3) the solid should not have any, or at most a very low, adsorption property.

In all the prior art and known solid-state chemiluminescent compositions inorganic fillers are used, such as basic quartz sand. For instance, in United States patent application, Pub. No. 2010/0288984, the patent requires an "inorganic material," see for example, paragraph 28, and both independent claims (claims 1 and 15) of the published application; the application particularly discusses use of inorganic oxides and salts, see for example, paragraphs 25 and 26 of the published application.

Although inorganic materials can be used for solid-state chemiluminescent composition and address some of the issues above—they are not ideal. Primarily because inorganics have possible reactivity issues and a density that is higher than desired. For instance: quartz sand, diatomaceous earth and kaolin are common inorganic materials used in such applications, and these (like all natural minerals) inevitably contain a variety of impurities, which may be reactive and could impact the chemiluminescence reaction, particularly if they contain, as is very common, impurities that are subject to oxidation, therefore prematurely reacting with the oxidant. Inorganics using silica, such as silica gel, have a strong adsorption property, which is undesirable for chemiluminescent reaction, since it reduces the amount of reactive chemicals available when the components are mixed, and thus negatively impacts the "glow" that is so desired in these products. In addition, all of these inorganic fillers have a relatively large density. The present invention seeks to address these shortcomings by using organic solids, which are less dense, exhibit lower adsorption properties, have little to no impurities, and are less reactive than the inorganic solids disclosed in the prior art.

Prior chemiluminescent solutions have enhanced stability by using a soluble organic polymer. Such as in U.S. Pat. No. 3,994,820 ('820), which discloses the use of polymer dissolved in the Oxalate component by heating the oxalate component to "80° C. for 5 to 10 minutes to effect complete solution of the polymers." (See Table III of the '820 patent.) U.S. Pat. No. 5,824,242 ('242) discloses the use of a soluble organic polymer used at below 5% concentration by weight in solution, accompanied with a suspension of a partially soluble or insoluble red-dyed polymer used at concentration of 2-40% (see Col. 3, Ln. 9-14), that is used to enhance the "red" color glow effect created by a Rubrene containing compound. The stabilizing polymers in '820 and '242 are present at relatively low percentages, and are fully solubilized in solution, and the partially insoluble polymers of '242 are present to enhance the "red" color glow effect, and further are also at relatively low percentages, insubstantial to create a solid-state compound suitable for use as a glow-sand that can be freely used without the need for an external storage container.

Further, in the prior art and all known chemiluminescent products, the oxidizer is used at concentrations above 2% by mass. For example, U.S. Pat. No. 7,674,406 and United States patent application 2010/0288984, describe a chemiluminescent composition, with the use of an oxidizer at 2%-20%.

However oxidizers are, by definition, are reactive, and such products having higher peroxide concentrations have proven to have stability issues and exhibit a gassing problem. After packaging, such as while on a store shelf, bags containing such mixtures slowly fill with gas as oxidizing reactions occur. Such reactions impact the shelf life and efficacy of the product, and the gassing can cause pressure to build in a sealed container, thereby creating a potential harmful situation. Further, the bags will appear bloated on the shelf, which is likely to discourage consumers and create shelf space and storage issues at retail. In one embodiment of the present invention the mixture employs oxidizers below 2% concentration, thereby limiting the reactivity, decreasing gassing, and increasing the stability of the mixture. By using a low concentration of oxidizer and an organic solid, the present inventions solves the stability issues present in the prior art.

SUMMARY OF THE INVENTION

The present invention describes a stable chemiluminescent composition and a production process for creating self-illuminating chemiluminescent compositions that can also include solid-state powder compositions that have a high level of stability, and can be applied to a variety of substrates that are generally sensitive to existing chemiluminescent compositions. The present invention creates a chemiluminescent composition with a very desirable and stable chemiluminescent effect. The sold-state composition of the present invention uses insoluble organic polymers present at concentrations above 50% by weight of the total composition, in order to create a stable "glow-sand" that can be used externally without a container, and can be applied similar to a glitter-paint, to various objects for a variety of purposes, such as recreational, marking, and safety purposes.

In one embodiment, the use of an insoluble organic polymer is combined with using a low (below 2%) concentration of Peroxide. As mentioned, the oxidizing nature of the peroxide can limit storage stability and shelf-life as well as reduce the intensity of the glow effect after the reaction is initiated by the user. Peroxides have a more drastic effect on inorganic solids, since such solids are more likely to contain oxidizable impurities than organic polymers, and by reducing the peroxide concentration as well as using an insoluble organic filler, higher stability can be achieved.

The solid-state chemiluminescent compositions of the present invention use organic fillers, which have several advantages over the inorganic fillers disclosed in the prior art: (1) the organic fillers are usually synthetic chemical products, and the types, quantity and stability of impurities can be easily controlled, (2) the density of inorganic fillers are commonly between 2 g/cm$^3$-4 g/cm$^3$, whereas the density of organic fillers are significantly less, usually well below 1 g/cm$^3$, allowing the same mass of organic fillers to be dispersed over a much larger volume, and therefore a larger light emitting area or volume is provided; and (3) organic fillers do not have the high adsorption properties of inorganic fillers, and therefore all of the active substances in the chemiluminescence reaction will remain on the surface of the filler, allowing all active substances to react with one another, achieving the maximum light output.

The luminescent advantages of the end-product is illustrated in Table 1, found in the detailed description, that illustrates a comparison between a first sample (#1), created using an inorganic filler, and a second sample (#2), created using an organic filler.

DETAILED DESCRIPTION

The composition of the present invention includes a component containing a luminescer with an oxalate (the "oxalate" component), an activator component containing an oxidant as activating ingredient that will oxidize the oxalate (the "activator" component), and one or more kinds of fluorescers, solvents and fillers, wherein the filler includes an organic solid. The oxalate component and the activator component are kept separate, and when mixed, react to create the "glow" effect. It should be understood that the organic solid filler can be present in either the oxalate or activator component, or both.

In a typical embodiment the device employs the traditional basic reaction. The activator is stored in the primary compartment and is also blended with the non-oxalate components, including the oxidant, fluorescer, solvent, chelating agent, buffer, organic solid, any thickening agent desired, as well as other fillers such as possible cosmetic products, hair and skin conditions, or perfumes.

The oxalate is stored within a separate breakable compartment, such that when a user breaks the compartment, the activator and oxalate mix and react to create the glow effect. When mixed the oxidant of the activator reacts with the oxalate to create highly reactive peroxy components that in turn act to excite the fluorescer, causing the glow effect. Depending on the fluorescer used, the color of the glow can be varied. It should be understood that this can be reversed, and the oxalate can be stored in the primary compartment and blended with the remaining non-activator ingredient, while the activator is stored in a separate breakable compartment. The container simply must keep the activator and oxalate separate until the user initiates the reaction.

The fluorescer will typically be at a low concentration percentage, typically below 1%. The concentrations of the remaining components can vary, for each of the oxalate, oxidant, and the solvent, with the remaining balance filled with the organic solid filler, wherein the organic solid will be at a concentration of at least 50% by mass of the total composition. Further, in the preferred embodiment, the concentration of the oxidizer is kept below 2%.

The above-mentioned oxidants can include hydrogen peroxide, sodium peroxide, sodium pyrophosphate peroxide, urea peroxide, high-sodium borate, histidine peroxide, hydrogen peroxide and tert-butyl peroxide acid. The preferred oxidant/peroxide material is hydrogen peroxide and/or carbamide peroxide.

Applicable oxalates in the above-mentioned components include: bis(2,4,5-trichloro-6-carbopentoxyphenyl) oxalate (CPPO), bis(2,4,5-trichlorophenyl) oxalate (TCPO), bis(2,4,5-tribromo-6-carbopentoxyphenyl) oxalate, bis(2-nitrophenyl) oxalate, bis(2,4-dinitrophenyl) oxalate, bis(2,6-dichloro-4-nitrophenyl) oxalate, bis(2,4,6-trichlorophenyl) oxalate, bis(3-trifluoromethyl-4-nitrophenyl) oxalate, bis(1,2-dimethyl-4,6-dinitrophenyl) oxalate, bis(2,4-dichloro phenyl) oxalate, bis(2,4-nitrophenyl) oxalate, bis(2,5-dinitrophenyl) oxalate, bis(2-formyl-4-nitrophenyl) oxalate, bis(e-chlorophenyl) oxalate, bis(1,2-dihydro-2-oxo-1-pyridyl) glyoxal, bis(2,4-dinitro-6-methylphenyl) oxalate. The preferred oxalates are bis(2,4,5-trichloro-6-carbopentoxyphenyl)oxalate (CPPO), bis(2,4,5-trichlorophenyl) oxalate (TCPO).

The concentration of the catalyst is generally 0.001%-5%, and applicable catalysts include sodium salicylate, salicylic acid potassium, lithium salicylate, 5-chloro sodium salicylate, 5-chloro salicylic acid, lithium acetate trifluoroacetate, pentachlorophenol potassium, tetrabutylammonium salicylate, tetrabutylammonium benzoate, tetrabutylammonium perchlorate, benzyl triethyl ammonium chloride, tetrabutylammonium bromide, cetyltrimethylammonium ammonium bromide, sodium dodecyl benzene sulfonate, cetyl sulfate, triethanolamine, sodium silicate. The preferred catalyst is sodium salicylate.

The composition of the chelating agents includes EDTA and a sodium, disodium, trisodium, or four sodium. The preferred chelating agent is EDTA or disodium EDTA, at a concentration of 0.02%-2%.

The fluorescers generally have spectral range of emission of 330 nm-1000 nm. The fluorescer can be mixed in with either the oxalate component or activator component, or both. The application of fluorescers as described in U.S. Pat. Nos. 3,729,426, 3,948,797, 4,017,415, 5,122,306, and 7,674,406 is incorporated herein. Common fluorescers are selected based on the color desired and include for example, 9,10-diphenylanthracene, 9,10-diphenyl acetylene anthracene, 1,8-dichloro-9,10-diphenyl acetylene anthracene, 2-ethyl-9,10-diphenyl acetylene anthracene, 1,6,7,12-tetra(o-chlorophenoxy)-N, and N'-bis(2,5-diisopropyl-phenyl)-3,4,9,10-perylene. The preferred fluorescers are 9,10-diphenylacetylene anthracene and 1,8-dichloro-9,10-diphenyl acetylene anthracene.

The preferred inorganic solvent used will be water. The possible organic solvents include ethyl acetate, dimethyl phthalate, dibutyl phthalate, butyl benzoate, ethyl benzoate, tert-butyl alcohol and water. The preferred organic solvents are dimethyl phthalate, butyl benzoate.

The organic filler can be present in either the activator component or oxalate components, or both, and is used at a concentration of at least 50% by mass of the total composition. The applicable organic fillers include, but are not limited to, polyethylene powder, polypropylene powder and polyester powder, where the organic filler is ground into a fine dust that can be easily mixed through the solution to create a homogeneous, viscous "sand." The preferred organic filler is polyethylene or polypropylene powder.

The non-aqueous thickener has a concentration of 0.1%-20%. Applicable non-aqueous thickener includes paraffin-based substances, polyethylene oxide and polyethylene glycol, where the preferred non-aqueous thickener is polyethylene glycol.

The aqueous thickener is generally a water-soluble polymer, with a general concentration of 0.1%-15%. Thickeners suitable for water, include corn starch, locust bean gum, guar gum, xanthan gum, gelatin, carboxymethyl cellulose (CMC), ethyl cellulose, hydroxyethyl cellulose, polyacrylic acid, polyacrylic acid derivatives, polyethylene glycol and polyvinyl pyrrolidone. The preferred thickeners are xanthan gum and polyvinyl pyrrolidone.

The following results illustrate the advantages of the present invention after the user has activated the products. Table 1 shows the durational intensity of the glow-effect produced by an inorganic solid (sample #1) as opposed to that of the present invention using an organic solid (sample #2).

Sample #1 (Prior Art, Using an Inorganic Solid)

In sample #1 the oxalate component is created by combining 2.1 g of alumina, 1.5 g of CPPO, 0.06 g of 9,10-diphenyl acetylene anthracene, and 0.85 g of dimethyl phthalate, mixed together to form the oxalate, or oxalate component. (Oxalate Component #1)

The activator component is produced by combining 21 g quartz sand, add 1.7 g of carbamide peroxide, 0.2 g of sodium salicylate and 1.4 g of water. (Activator Component #1)

Sample #2 (Present Invention)

In sample #2, the oxalate component is produced by combining 0.8 g of polypropylene (PP) powder, 1.5 g of CPPO, 0.06 g of 9,10 diphenyl acetylene anthracene, and 0.7 g of dimethyl phthalate ("Oxalate Component #2"). The Oxalate Component #2 has the same volume as Oxalate Component #1.

The activator component is produced by combining 7.5 g of polypropylene (PP) powder, 1 g of carbamide peroxide, 0.2 g of sodium salicylate, 1 g of water, 0.015 g of EDTA, 0.3 g of dimethyl phthalate and 0.1 g of xanthan gum ("Activator Component #2"). The Activator Component #2 has the same volume as Activator Component #1.

The activator and oxalate components are mixed with their respective counterparts, to produce respectively, Sample #1 and Sample #2, each having the same volume. A Luminometer was used to measure luminous intensity of Sample #1 and #2 over time. The intensity values are shown in Table 1.

TABLE 1

SAMPLE #1 AND SAMPLE #2 LUMINOUS INTENSITY • UNIT: LUX•

| | Minutes | | | | | | |
|---|---|---|---|---|---|---|---|
| | 5 | 15 | 30 | 60 | 120 | 180 | 240 |
| Sample #1 | 47.0 | 16.0 | 8.82 | 3.13 | 1.06 | 0.64 | 0.57 |
| Sample #2 | 60.8 | 23.2 | 14.6 | 6.35 | 1.59 | 0.85 | 0.55 |

As illustrated in Table 1, the use of organic solids (sample #2) produced a far superior glow intensity than the use of inorganic solids (Sample #1). As discussed, this is likely due to the reactivity and adsorption properties of the inorganic material, which limit the reactive chemicals available when the user initiates the reaction.

Further, due to stability issues, it is expected that the results for a compound made with inorganic solids, such as sample #1, will continue to deteriorate over time as the product sits, awaiting activation by a user. This instability has been seen in the significant gassing/bloating of packaging containing such mixtures for prolonged periods of time, such as when sitting on a store shelf. This problem is exacerbated by higher concentrations of the oxidant, which will react with impurities in the inorganic filler.

TABLE 2

FIRST EMBODIMENT (example of a solid-state composition with organic Polypropylene filler)

| | Component | % Content |
|---|---|---|
| Oxalate component | Polypropylene powder | 9.10% |
| | CPPO | 9.10% |
| | 9,10-diphenyl acetylene anthracene | 0.36% |
| | Dimethyl phthalate | 7.28% |
| Activator component | Polypropylene powder | 54.60% |
| | Carbamide peroxide | 9.10% |
| | Sodium salicylate | 1.36% |
| | Water | 9.10% |
| Total | | 100% |

TABLE 3

SECOND EMBODIMENT (example of a solid-state composition with organic Polyethylene filler)

| | Component | % Content |
|---|---|---|
| Oxalate component | Polyethylene powder | 8.45% |
| | Alumina | 25.34% |
| | CPPO | 2.54% |
| | 1,8-dichloro-9,10-diphenyl acetylene Anthracene | 0.08% |
| | Dimethyl phthalate | 1.69% |
| Activator component | Polyethylene powder | 50.68% |
| | Carbamide peroxide | 5.91% |
| | Sodium salicylate | 0.84% |
| | Water | 4.22% |
| | EDTA-2Na | 0.08% |
| | Xanthan gum | 0.17% |
| Total | | 100% |

TABLE 4

THIRD EMBODIMENT (example of a glow-gel with peroxide <2%)

| | Component | % Content |
|---|---|---|
| Oxalate component | CPPO | 9.3% |
| Activator component | Water | 81.2% |
| | Carbamide peroxide | 1.3% |
| | Triethanolamine | 0.93% |
| | Benzyltriethylammonium Chloride | 0.28% |
| | Carbomer | 0.93% |
| | 9,10-diphenyl acetylene anthracene | 0.46% |
| | Dimethyl phthalate | 5.6% |
| Total | | 100% |

TABLE 5

FOURTH EMBODIMENT (example of a solid-state composition with organic polyethylene filler and peroxide <2%)

| | Component | % Content |
|---|---|---|
| Oxalate component | Polyethylene powder | 20.5% |
| | CPPO | 7.55% |
| | 9,10-diphenyl acetylene anthracene | 0.32% |
| | Dimethyl phthalate | 7.89% |
| Activator component | Polyethylene powder | 51.34% |
| | Carbamide peroxide | 1.95% |
| | Sodium salicylate | 2.24% |
| | Water | 4.22% |
| | EDTA-2Na | 0.08% |
| | Dimethyl phthalate | 3.91% |
| Total | | 100% |

What is claimed is:

1. A solid-state chemiluminescent composition comprising an oxalate component and an activator component, wherein the two different components are stored in two separate containers wherein said containers are separated from each other by a breakable barrier such that when said barrier is broken the contents of the two separate containers will mix, wherein one of said containers is used to store an oxalate component, and the other of said containers stores an activator component, wherein at least one of said oxalate or activator components is a viscous mixture, such that said component does not flow freely when removed from said container, and at least one of said oxalate or activator components further contains a fluorescer, and said activator component contains a peroxide at a concentration below 2% by weight of the total composition, and wherein at least one of said oxalate or activator components contains an organic polymer, the combined concentration of said organic polymer contained in both components is above 50% by weight of the total composition, and said organic polymer is an insoluble solid.

2. A method for making a solid-state chemiluminescent composition wherein two different components are stored in two separate containers wherein said containers are separated from each other by a breakable barrier such that when said barrier is broken the components of the two separate containers will mix, wherein one of said containers is used to store an oxalate component, and the other of said containers stores an activator component, wherein at least one of said oxalate or activator components is a viscous mixture, such that said component does not flow freely when removed from said container, and at least one of said oxalate or activator components further contains a fluorescer, and said activator component contains a peroxide at a concentration below 2% by weight of the total composition, and wherein at least one of said oxalate or activator components contains an organic polymer, the combined concentration of said organic polymer contained in both components is above 50% by weight of the total composition, and said organic polymer is an insoluble solid.

* * * * *